March 30, 1948.  N. B. F. HOLLANDER  2,438,558
LEVELLING TOOL
Filed Sept. 24, 1945  2 Sheets-Sheet 1
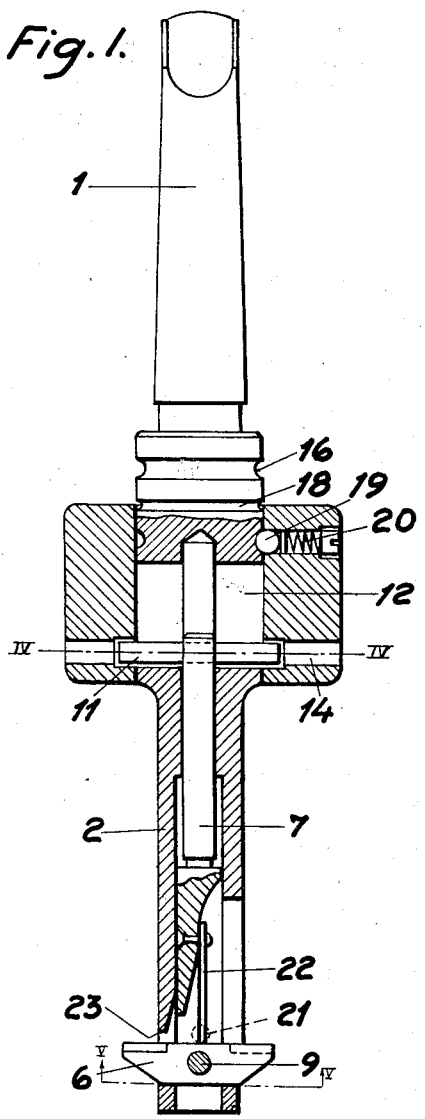
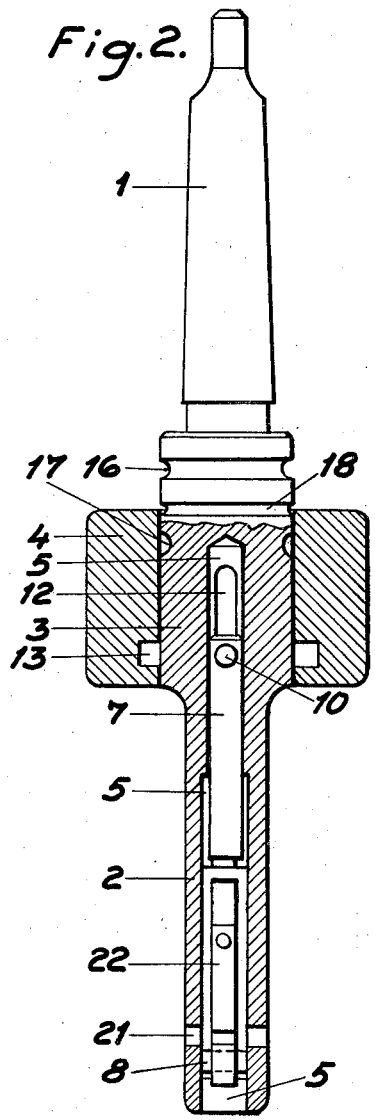
INVENTOR
NILS BERTIL FREDRIK HOLLANDER
BY  [signature]
HIS ATT'Y March 30, 1948.　　N. B. F. HOLLANDER　　2,438,558
LEVELLING TOOL
Filed Sept. 24, 1945　　2 Sheets-Sheet 2
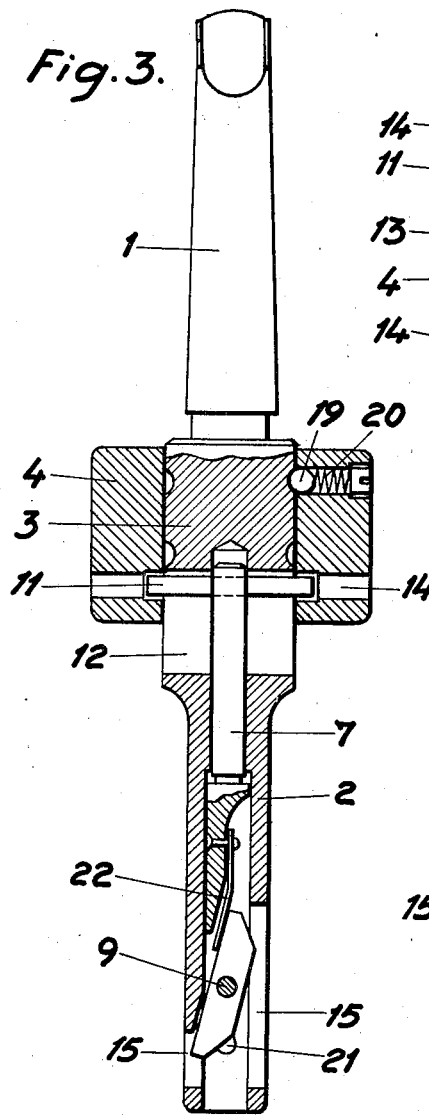
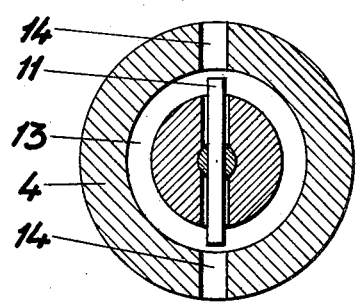
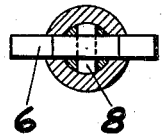
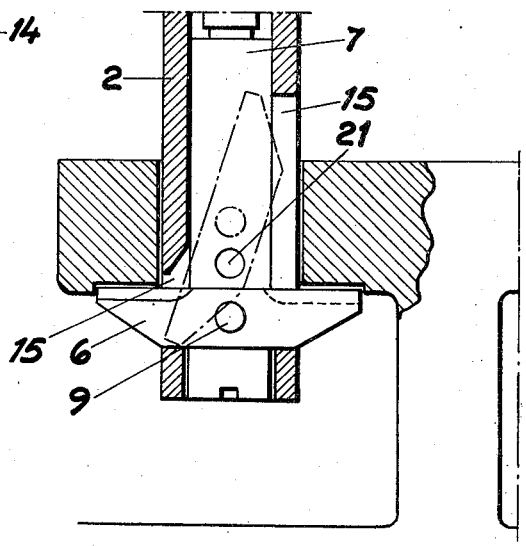
INVENTOR
NILS BERTIL FREDRIK HOLLANDER
BY
HIS ATTY Patented Mar. 30, 1948

2,438,558

UNITED STATES PATENT OFFICE 2,438,558

LEVELLING TOOL

Nils Bertil Fredrik Hollander,
St. Essingen, Sweden

Application September 24, 1945, Serial No. 618,283
In Sweden September 15, 1944

4 Claims. (Cl. 77—58)

The present invention relates to a tool with retractable cutter for levelling from below the surface around a hole and is substantially characterized by the fact that the cutter is swingably fixed on a piston which is axially displaceable in a cylindric portion of the tool, the said cylindric portion being adapted to be pushed through the hole whose underside is to be levelled, the said piston being connected with the cylindric portion in such a way that, when the piston has been pushed to an end position in the cylindric portion, the cutter has been swung out to working position through an axial groove in the said portion. The invention eliminates the drawbacks which are connected with the apparatus now used in boring machines for levelling from below the surface around bolt holes in flanges or the like, in order to form a suitable contact surface for the bolt head or bolt nut, which often occurs in moulded constructions, such as bearing boxes, frames or the like, the said drawbacks being due to the fact that the levelling tool in the boring machine must operate from below upwards. In the known devices the boring rod has a transverse rectangular groove in which, after the boring rod has been pushed down through the bored hole, the cutter is inserted and fixed by a screw. After the lower surface has been levelled, the boring machine is to be stopped, the screw detached and the cutter taken out, whereafter the boring rod is pushed down in the next hole and the procedure is repeated. All this requires much time, not to speak of the necessity of having a suitable wrench at hand. When the cutter is to be removed there is also the risk of accidents which have occurred more than once because the boring machine has started for some reason or other. The method is obviously primitive and expensive, and it has been a general wish to obtain a device which eliminates the long time required for the manual work as well as the possibilities of accidents, and which makes the tool as handy as possible.

The invention satisfies all the demands of a tool of this kind in the abovementioned respects. In practical use it has appeared that the work with the same is made quickly and without risks by a single manipulation, the abovementioned time required for manual work being considerably reduced. The necessary operations can be made while the machine is running.

An embodiment of the invention is illustrated on the accompanying drawing, in which:

Fig. 1 is a partial section of the apparatus with the cutter in working position.

Fig. 2 is a partially sectioned view taken at right angles to Fig. 1.

Fig. 3 is a partially sectioned view with retracted cutter.

Fig. 4 is a section on line IV—IV in Fig. 1, and

Fig. 5 is a section on line V—V in Fig. 1

Fig. 6 is a partially sectioned view showing how the tool is used.

The main part of the tool, the spindle, consists of a portion 1 of standard construction with conical upper end and adapted to fit in the boring machine in question, of a lower cylindric portion 2 having a diameter equal to the outer diameter of the screw or bolt, and of an intermediate cylindric portion 3 fitting the hole in the operating ring 4. The cylindric portion 2 is provided with the bore 5 in which the piston 7 is located, the said piston being cut up to receive the cutter 6. The piston 7 is at the lower end fork-shaped and the prongs are provided with the bore 8 in which the pin 9 is inserted. The pin 9 also fits in a hole in the cutter 6, the said cutter being suspended by means of the pin 9 between the prongs of the fork formed by the cut up piston 7. The piston 7 which can glide in the axial direction in the hole 5, has in its upper end a hole 10 in which the pin 11 is fitted. A groove 12 is made in the cylindric portion 3, in order that the pin 11 and thus the piston 7 shall be displaceable in the axial direction as far as admitted by the groove 12. The pin 11 lies with its both ends in the turned groove 13 in the ring 4. The pin 11 is inserted in its place through the hole 14 in the ring 4 which can rotate around the cylindric portion 3 after the pin 11 has come in its correct position. In the cylindric portion 2 there is a groove 15 in which the cutter 6 fits. In the cylindric portion 3 there are turned three ring grooves 16, 17 and 18 which correspond to three positions of the piston 7 and which are fixed by the ball 19 which is depressed by the spring 20 into the grooves 16, 17 and 18 when they pass the ball 19. The groove 16 corresponds to the upper position of the piston 7, the groove 17 to the lower position of the piston and the groove 18 which is less deep than 16 and 17, to the position of the piston 7 when the hole 8 in the cutter 6 is in front of the hole 21 in the cylindric portion 2. In this position the pin 9 can be pushed out and the steel 6 be removed. In the piston 7 there is riveted the plate spring 22 which exerts a permanent pressure on the cutter 6 when the latter is in the retracted position. The upper edge 23 of the groove 15 is fitted in such a way that the cutter 6 strikes against the same when the piston 7 is drawn upwards, the cutter 6 turning around the pin 9 in order to, when the piston 7 has been completely drawn up, assume the position shown in the right one of the three longitudinal sections (Fig. 3). The ball 19 is then located in the groove 16.

When the tool is to be used and the initial position is the one shown in Fig. 1, for example (the ball is then located in the groove 17), the ring 4 is drawn upwards. The piston 7 then obtains an upward movement because the groove 13 forces the pin 11 and thus the piston 7 upwards. After a few moments the cutter 6 strikes against the edge 23 in the groove 15, the cutter 6 turning around the pin 9 in order to, when the ball 19 has come into the groove 16, assume the position shown in Fig. 1. The cylindric portion 2 can now be inserted in the hole the underside of which is to be levelled. The ring 4 is now depressed, the plate spring 22 pressing out the cutter 6 through the groove 15 whereafter the cutter 6 returns to the initial position when the ball 19 has come into the groove 17. This position is shown in Fig. 6. The levelling can now be made whereafter the procedure is repeated.

These manipulations are made in a very short time, and according to calculations only ⅓ of the time which is now required with usual tools, need be used.

The details of the invention described above and illustrated on the drawing can of course be varied in some respect or other without going beyond the scope of the invention.

Having now described my invention, what I claim as new and desire to secure by Letters Patent is:

1. A cutting tool comprising a tool holder, a cutter pivotally mounted centrally thereof on said holder and a cylindrical body in which said holder is axially adjustable, said body having parallel slots longitudinally disposed on either side of its lower end so that as said holder is lowered in said body the cutter projects out of said body to dispose its cutting edges on either side of the body, the top edge of one of said slots being lower than the top edge of the other of said slots so that as said holder is raised the cutter engages said lower edge to pivot and retract into said body.

2. A cutting tool as claimed in claim 1 comprising a sleeve around said cylindrical body and connected to the upper end of said tool holder for axial movement therewith.

3. A cutting tool as claimed in claim 1 comprising spring means disposed in said cylindrical body and pressing against one end of said cutter to cause said cutter to pivot on said tool holder and project out of said body when said holder is lowered.

4. A cutting tool as claimed in claim 1 in which said lower top edge is tapered for engagement with said cutter.

NILS BERTIL FREDRIK HOLLANDER.

REFERENCES CITED

The following references are of record in the file of this patent:

UNITED STATES PATENTS

| Number | Name | Date |
| --- | --- | --- |
| 214,720 | Shur | Apr. 22, 1879 |
| 1,392,960 | Mizzell | Oct. 11, 1921 |
| 2,229,094 | Knox | Jan. 21, 1941 |
| 2,314,084 | Fried | Mar. 16, 1943 |